(12) United States Patent
Schlipf

(10) Patent No.: US 8,302,913 B2
(45) Date of Patent: Nov. 6, 2012

(54) HIGH-LIFT SYSTEM FOR AN AIRCRAFT

(75) Inventor: Bernhard Schlipf, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 636 days.

(21) Appl. No.: 12/376,258

(22) PCT Filed: Aug. 6, 2007

(86) PCT No.: PCT/EP2007/006945
§ 371 (c)(1),
(2), (4) Date: Feb. 3, 2009

(87) PCT Pub. No.: WO2008/015024
PCT Pub. Date: Feb. 7, 2008

(65) Prior Publication Data
US 2009/0308982 A1    Dec. 17, 2009

(30) Foreign Application Priority Data
Aug. 4, 2006  (DE) .......................... 10 2006 036 464

(51) Int. Cl.
*B64C 3/50* (2006.01)
(52) U.S. Cl. ...................................... 244/215
(58) Field of Classification Search .................. 244/213, 244/215, 216, 217
See application file for complete search history.

(56) References Cited

U.S. PATENT DOCUMENTS

| 2,407,401 A | 9/1946 | Clauser et al. |
|---|---|---|
| 3,874,617 A | 4/1975 | Johnson |
| 4,283,029 A | 8/1981 | Rudolph |
| 4,381,092 A | 4/1983 | Barker |
| 4,381,093 A | 4/1983 | Rudolph |
| 4,763,862 A * | 8/1988 | Steinhauer et al. ........... 244/215 |
| 5,199,538 A | 4/1993 | Fischer et al. |

(Continued)

FOREIGN PATENT DOCUMENTS

DE    197 32 953    7/1997

(Continued)

OTHER PUBLICATIONS

English language translation of Japanese Office Action issued in Japanese counterpart application No. 2009-522185 (3 pages).

*Primary Examiner* — Tien Dinh
*Assistant Examiner* — Michael Kreiner
(74) *Attorney, Agent, or Firm* — Greenblum & Bernstein, P.L.C.

(57) ABSTRACT

An exemplary high-lift system for an aircraft includes a wing, a high-lift flap coupled to the wing, a kinematic element which is driven by a drive device, and a flap lever structured and arranged to rotate via an actuating drive between a retracted position in which the high-lift flap complements a wing profile and a plurality of extended positions in which a slot of a given width is formed between the wing and the high-lift flap. A first end of the flap lever is coupled to the high-lift flap. A second end of the flap lever is coupled to the kinematic element and is capable of rotating relative thereto via a first rotation point. The kinematic element is structured and arranged to rotate relative to a second rotation point that is fixed in position relative to the wing. The first rotation point is separated by a predetermined distance from the second rotation point.

9 Claims, 4 Drawing Sheets

U.S. PATENT DOCUMENTS

| | | | | |
|---|---|---|---|---|
| 5,230,487 A | * | 7/1993 | Gartelmann et al. | 244/216 |
| 5,788,190 A | | 8/1998 | Siers | |
| 6,076,775 A | | 6/2000 | Bauer | |
| 7,798,450 B2 | * | 9/2010 | Patzelt et al. | 244/211 |
| 2005/0040294 A1 | * | 2/2005 | Perez-Sanchez et al. | 244/215 |
| 2006/0202089 A1 | * | 9/2006 | Reckzeh et al. | 244/215 |
| 2008/0169383 A1 | | 7/2008 | Patzelt et al. | |

FOREIGN PATENT DOCUMENTS

| | | | |
|---|---|---|---|
| DE | 697 29 361 | | 10/2004 |
| DE | 103 28 540 | | 2/2005 |
| DE | 10328540 | * | 2/2005 |
| DE | 103 39 030 | | 3/2005 |
| EP | 0272396 | * | 10/1987 |
| EP | 0 272 396 | | 6/1988 |
| EP | 0 838 394 | | 4/1998 |
| GB | 1 508 389 | | 4/1978 |
| GB | 2 038 737 | | 7/1980 |
| WO | WO 2005/021375 | | 3/2005 |
| WO | WO2005/077756 | | 8/2005 |
| WO | WO2008/015024 | | 2/2008 |

* cited by examiner

HIGH-LIFT SYSTEM FOR AN AIRCRAFT

CROSS-REFERENCE TO RELATED APPLICATIONS

The present application is a U.S. National Stage of International Patent Application No. PCT/EP2007/006945 filed Aug. 6, 2007 which published as WO 2008/015024 on Feb. 7, 2008, and claims priority of German Patent Application No. 10 2006 036 464.3 filed Aug. 4, 2006.

BACKGROUND OF THE INVENTION

1. Field of the Invention

The invention relates to a high-lift system for an aircraft and a method of using the system in an aircraft.

2. Discussion of Background Information

Large numbers of high-lift systems for aircraft are known. In general, these comprise high-lift flaps which are arranged on the aircraft mainplane and can be moved by means of an actuating drive between a retracted position, in which the flap continuously complements the wing profile essentially without any gap, and a plurality of extended positions, in which a slot of given width is formed between the wing and the flap and the flap is positioned at a predetermined angle with respect to the wing profile. The flap is extended in an entirely general manner in a movement which on the one hand comprises movement of the flap with respect to the wing to the rear, and thus lengthening of the effective wing profile, and on the other hand an increase in the incidence angle of the flap with the profile curvature being increased, thus resulting in an increase in the aerodynamic lift. Air flows at high speed through the slot that is formed between the flap and the wing when in the extended position, from the lower face of the wing to the upper face of the flap, thus making a further contribution to the increase in lift.

On the one hand, so-called Fowler flaps should be mentioned and are in particular among the most widely used types of high-lift systems nowadays. In the case of Fowler flaps, while the flap is being extended, it moves backwards away from the wing forming the slot between the wing and the flap, with an increase in the incidence angle of the flap being superimposed on this movement, particularly as the flap extension increases. This combined movement is also referred to as a Fowler movement.

On the other hand, an arrangement which is referred to as dropped hinge kinematics or pivoting flap kinematics is known, in which the high-lift flap is mounted on a flap lever such that it can pivot about a rotation point that is provided under the wing. As the name itself implies, the flap is moved about the rotation point, which is located under the wing, during extension, on a path which is in the form of a circular arc.

SUMMARY OF THE INVENTION

The invention aims to provide an improved high-lift system.

The invention provides a high-lift system for an aircraft, having a high-lift flap which is arranged on the mainplane of the aircraft, is mounted such that it can pivot at one or more rotation points on the wing or on a carriage or a lever which is coupled to the wing, and can be moved by way of an actuating drive between a retracted position, in which the flap continuously complements the wing profile essentially without any gap, and a plurality of extended positions, in which a slot of the given width is formed between the wing and the flap, and the flap is positioned at a predetermined angle with respect to the wing profile. According to the invention, the rotation point, about which the flap can be pivoted is arranged in a variable position with respect to the wing or the carriage or lever which is coupled to the wing.

According to one embodiment of the invention, the flap is mounted on a flap lever such that it can pivot about a rotation point which is provided under the wing.

The flap is arranged in a fixed position on the flap lever and can pivot on a circular path about the rotation point.

According to another embodiment of the invention, the rotation point about which the flap can pivot can be formed by a first joint on a carriage which can be moved on a track which extends obliquely downwards to the rear on the wing.

The rotation point about which the flap can pivot can be formed by a second joint which is located further to the rear of the flap with respect to the direction of flow of the air flowing around the wing and is coupled to a third joint, which is arranged on the wing, via a lever by way of which the rear part of the flap is drawn downwards in the sense of increasing the incidence angle as the extension movement increases.

The rotation point about which the flap can pivot can be formed by a third joint which is arranged on the wing and by way of which a second joint, which is located in the rear area of the flap is coupled via a lever by way of which the rear part of the flap is drawn downwards in the sense of increasing the incidence angle as the extension movement increases.

According to one embodiment of the invention, the flap is arranged in a fixed position with respect to the flap lever, and can be pivoted about the rotation point on a circular path.

According to one embodiment of the high-lift system according to the invention, the rotation point, about which the flap can be pivoted is provided on a kinematic element which is arranged such that it can move with respect to the wing or with respect to a carriage or lever which is coupled to the wing, and the position of which element can be varied by way of a drive device. The kinematic element is in general a movement apparatus for moving or positioning the rotation point which can be moved as required.

The kinematic element may be formed by a lever or an eccentric which is mounted such that it can rotate about a second rotation point on the wing or on the carriage or lever which is coupled to the wing, with the first rotation point about which the flap is mounted such that it can rotate being at a distance from the second rotation point, and with the lever or eccentric being movable about the second rotation point by the drive device.

The second rotation point may be fixed in position on the wing.

According to one embodiment of the high-lift system according to the invention, the drive device by way of which the position of the kinematic element can be varied can be operated independently of the actuating drive for the high-lift flap.

According to another embodiment, the drive device by way of which the position of the kinematic element can be varied can be operated positively coupled to the actuating drive for the high-lift flap.

The kinematic element can be operated by an electrical or hydraulic drive device which is coupled to the kinematic element.

One exemplary embodiment of the invention provides that the rotation point, about which the flap is mounted such that it can pivot can be moved by the drive device such that the rotation point assumes a first position with respect to the aircraft longitudinal direction and the aircraft vertical direction when the flap is in the retracted position, corresponding to the cruise flight position, in which first position the flap continuously complements the wing profile, essentially without any gap, and assumes a second position, which is located under the first position with respect to the aircraft vertical direction, in a first extended position of the flap, which corresponds to a takeoff position.

In this case, it is possible to provide that, the rotation point, about which the flap lever is mounted such that it can pivot assumes a second position, when the flap is in the first extended position which corresponds to the takeoff position, which second position is also located forward of the first position, which corresponds to the cruise flight position, with respect to the aircraft longitudinal direction.

Furthermore, it is possible to provide that the rotation point, about which the flap is mounted such that it can pivot assumes a third position when the flap is in a second extended position, which corresponds to a landing position, which third position is located aft of the second position with respect to the aircraft longitudinal direction and above the second position, which corresponds to the takeoff position, with respect to the aircraft vertical direction.

According to one embodiment of the high-lift system according to the invention, it is possible to move continuously between the positions of the rotation point which correspond to the various positions of the flap, about which the flap can be pivoted, on a circular path whose centre point forms the second rotation point.

According to one embodiment, the invention provides for a high-lift system for an aircraft, comprising a wing, a high-lift flap coupled to the wing, a kinematic element which is driven by a drive device, and a flap lever structured and arranged to rotate via an actuating drive between a retracted position in which the high-lift flap complements a wing profile and a plurality of extended positions in which a slot of a given width is formed between the wing and the high-lift flap. A first end of the flap lever is coupled to the high-lift flap. A second end of the flap lever is coupled to the kinematic element and being capable of rotating relative thereto via a first rotation point. The kinematic element is structured and arranged to rotate relative to a second rotation point that is fixed in position relative to the wing. The first rotation point is separated by a predetermined distance from the second rotation point.

The high-lift flap may be coupled to the wing via a dropped hinge mechanism. The kinematic element may comprise a lever. The kinematic element may comprise an eccentric.

The high-lift flap may be structured and arranged to assume the following positions upon rotation of the kinematic element; a retracted or cruise flight position, whereby the high-lift flap continuously complements the wing profile and the first rotation point assumes a first position with respect to an aircraft longitudinal direction and an aircraft vertical direction, a first extended or take-off position, whereby the first rotation point assumes a second position located under the first position with respect to the aircraft vertical direction and forward of the first position with respect to the aircraft longitudinal direction, and a second extended or landing position, whereby the first rotation point assumes a third position which is located aft of the second position with respect to the aircraft longitudinal direction and above the second position with respect to the aircraft vertical direction.

The kinematic element may comprise one of a lever and an eccentric. The drive device and the actuating drive may be capable of being operated one of in a coupled manner and independently. The first rotation point may change rotationally when the kinematic element is rotated about the second rotation point.

The invention also provides for a method of using the system described above, wherein the method comprises rotating the kinematic element in order to move the high-lift flap between the following positions; a retracted or cruise flight position, whereby the high-lift flap continuously complements the wing profile and the first rotation point assumes a first position with respect to an aircraft longitudinal direction and an aircraft vertical direction, a first extended or take-off position, whereby the first rotation point assumes a second position located under the first position with respect to the aircraft vertical direction and forward of the first position with respect to the aircraft longitudinal direction, and a second extended or landing position, whereby the first rotation point assumes a third position which is located aft of the second position with respect to the aircraft longitudinal direction and above the second position with respect to the aircraft vertical direction.

The invention also provides for a high-lift system for an aircraft, comprising a wing, a high-lift flap coupled to the wing, a high-lift flap being movable via an actuating drive between a retracted position in which the high-lift flap complements a wing profile, and a plurality of extended positions in which a slot of a given width is formed between the wing and the high-lift flap, and a carriage. The high-lift flap is rotationally coupled to the carriage via a first joint. A track is adapted to guide the carriage. A lever has a first end coupled to the high-lift flap via a second joint and a second end coupled to a rear end of the track via a third joint. At least one of the first, second and third joints comprising a kinematic element. The kinematic element is movable via a drive device that is capable of varying a position of at least one of the first, second and third joints.

The first joint may comprise the kinematic element. The second joint may comprise the kinematic element. The third joint may comprise the kinematic element. The high-lift flap may be coupled to the wing via a track rear link kinematics. The kinematic element may comprise one of a lever and an eccentric.

The high-lift flap may be structured and arranged to assume the following positions upon rotation of the kinematic element; a retracted or cruise flight position, whereby the high-lift flap continuously complements the wing profile and a first rotation point assumes a first position with respect to an aircraft longitudinal direction and an aircraft vertical direction, a first extended or take-off position, whereby the first rotation point assumes a second position located under the first position with respect to the aircraft vertical direction and forward of the first position with respect to the aircraft longitudinal direction, and a second extended or landing position, whereby the first rotation point assumes a third position which is located aft of the second position with respect to the aircraft longitudinal direction and above the second position with respect to the aircraft vertical direction.

The kinematic element may comprise one of a lever and an eccentric. The drive device and the actuating drive are capable of being operated one of in a coupled manner and independently.

The invention also provides for a method of using the system described above, wherein the method comprises rotating the kinematic element in order to move the high-lift flap between the following positions; a retracted or cruise flight position, whereby the high-lift flap continuously complements the wing profile and a first rotation point assumes a first position with respect to an aircraft longitudinal direction and an aircraft vertical direction, a first extended or take-off position, whereby the first rotation point assumes a second position located under the first position with respect to the aircraft vertical direction and forward of the first position with respect to the aircraft longitudinal direction, and a second extended or landing position, whereby the first rotation point assumes a third position which is located aft of the second position with respect to the aircraft longitudinal direction and above the second position with respect to the aircraft vertical direction.

The invention also provides for a high-lift system for an aircraft, comprising a wing, a high-lift flap coupled to the wing via at least one of a dropped hinge mechanism and a track rear link kinematics, and a kinematic device which is driven by a drive, is capable of rotating about a rotation point between first, second and third rotation positions, and, when rotated, changes a position of the high-lift flap. The high-lift flap may be structured and arranged to assume the following positions upon rotation of the kinematic device about the rotation point; a retracted or cruise flight position, whereby the high-lift flap continuously complements the wing profile based on the first rotation position of the kinematic device with respect to an aircraft longitudinal direction and an aircraft vertical direction, a first extended or take-off position, whereby the second rotation position of the kinematic element assumes a position located under the first rotating position with respect to the aircraft vertical direction and forward of the first rotation position with respect to the aircraft longitudinal direction, and a second extended or landing position, whereby the third rotation point of the kinematic device assumes a position which is located aft of the second rotation position with respect to the aircraft longitudinal direction and above the second rotation position with respect to the aircraft vertical direction.

BRIEF DESCRIPTION OF THE DRAWINGS

The invention will be described in the following text with reference to the attached figures, in which.

DETAILED DESCRIPTION OF THE INVENTION

Figure 1:
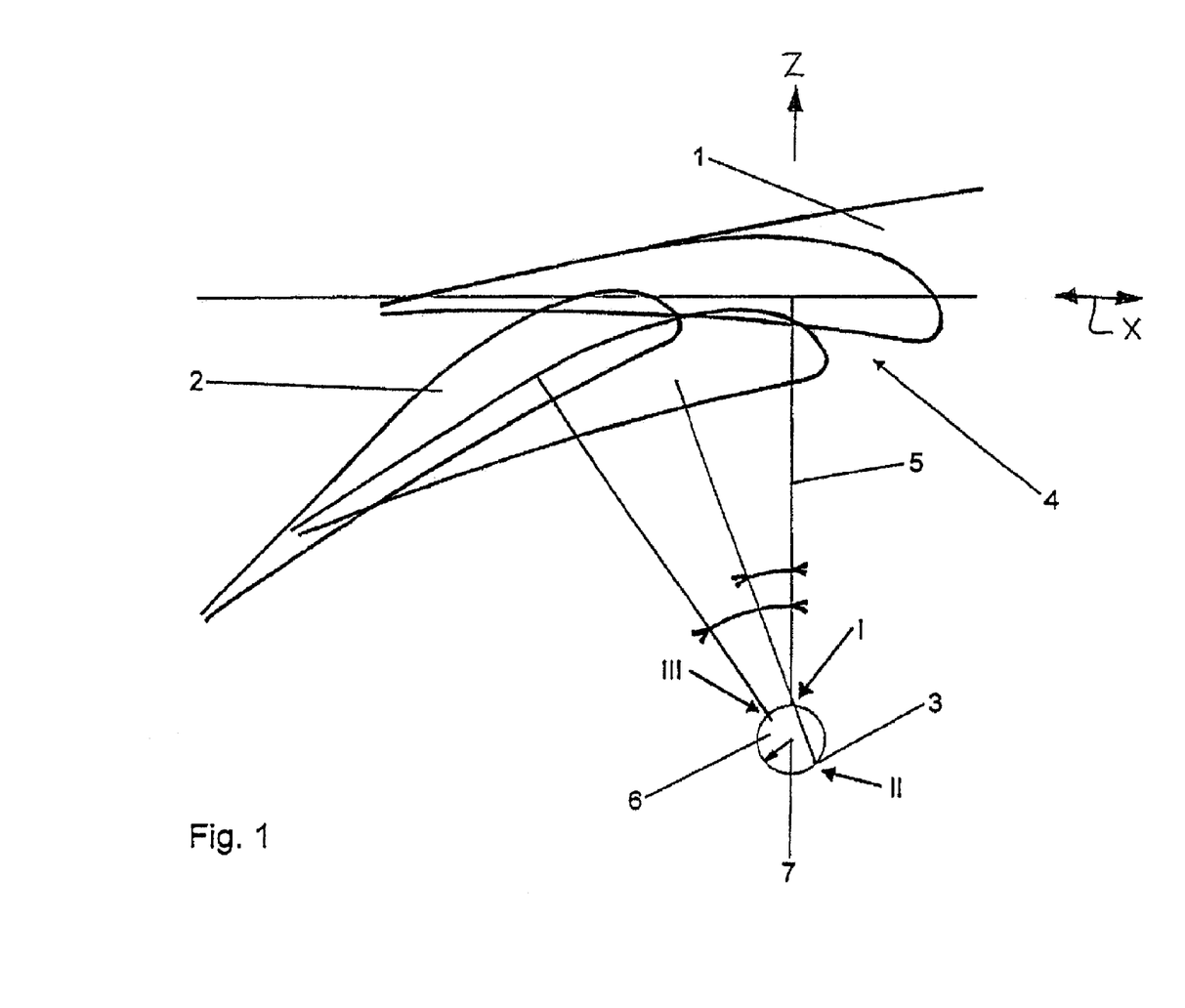
FIG. 1 shows a schematic side cross-sectional illustration of a high-lift system for an aircraft according to one exemplary embodiment of the invention.
Figure 2:
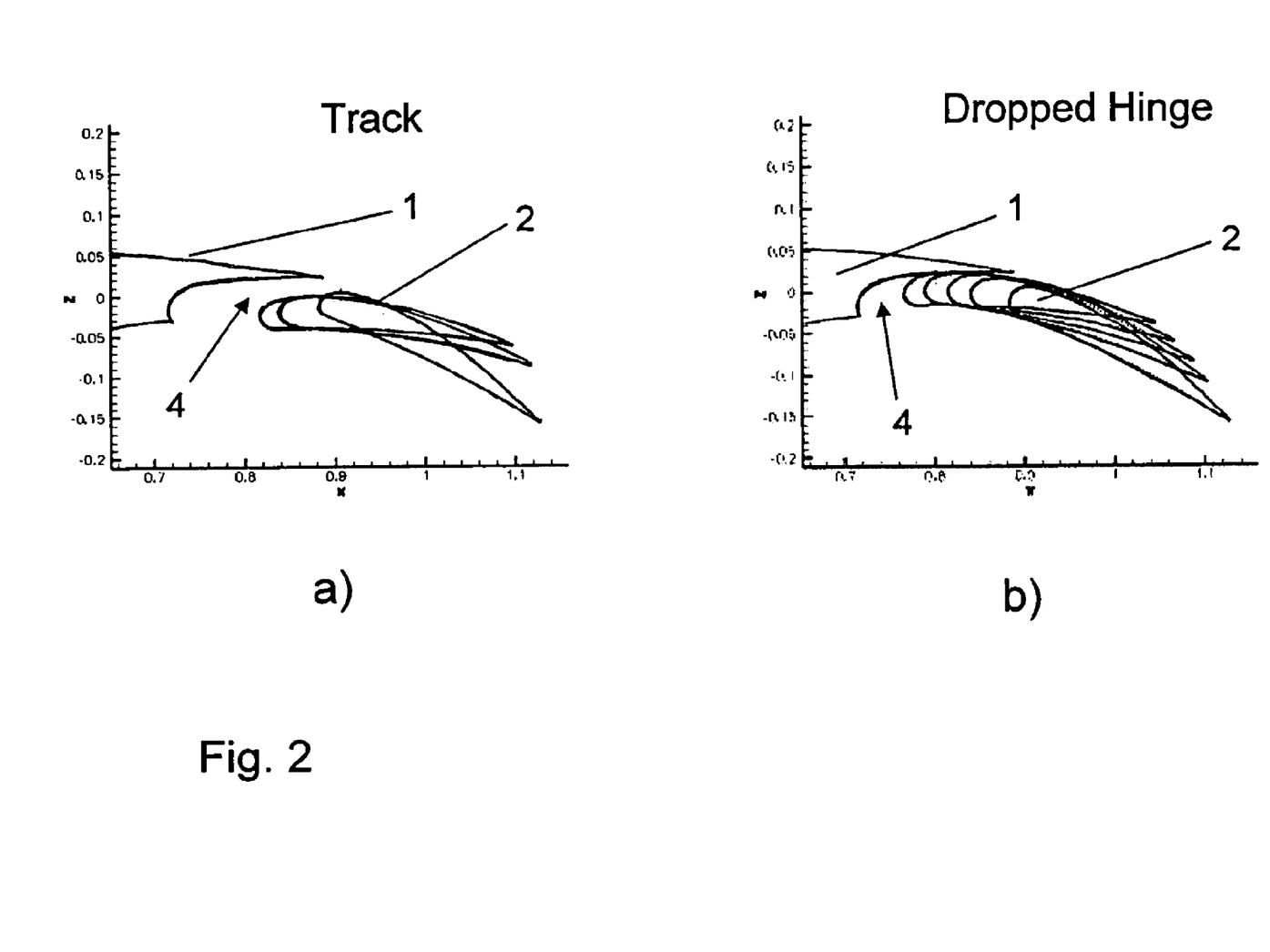
FIG. 2a shows a schematic illustration of various phases during the extension movement of flap systems with Track Rear Link Kinematics.
FIG. 2b shows a schematic illustration of various phases in the extension movement of flap systems with dropped hinged kinematics.
Figure 4:
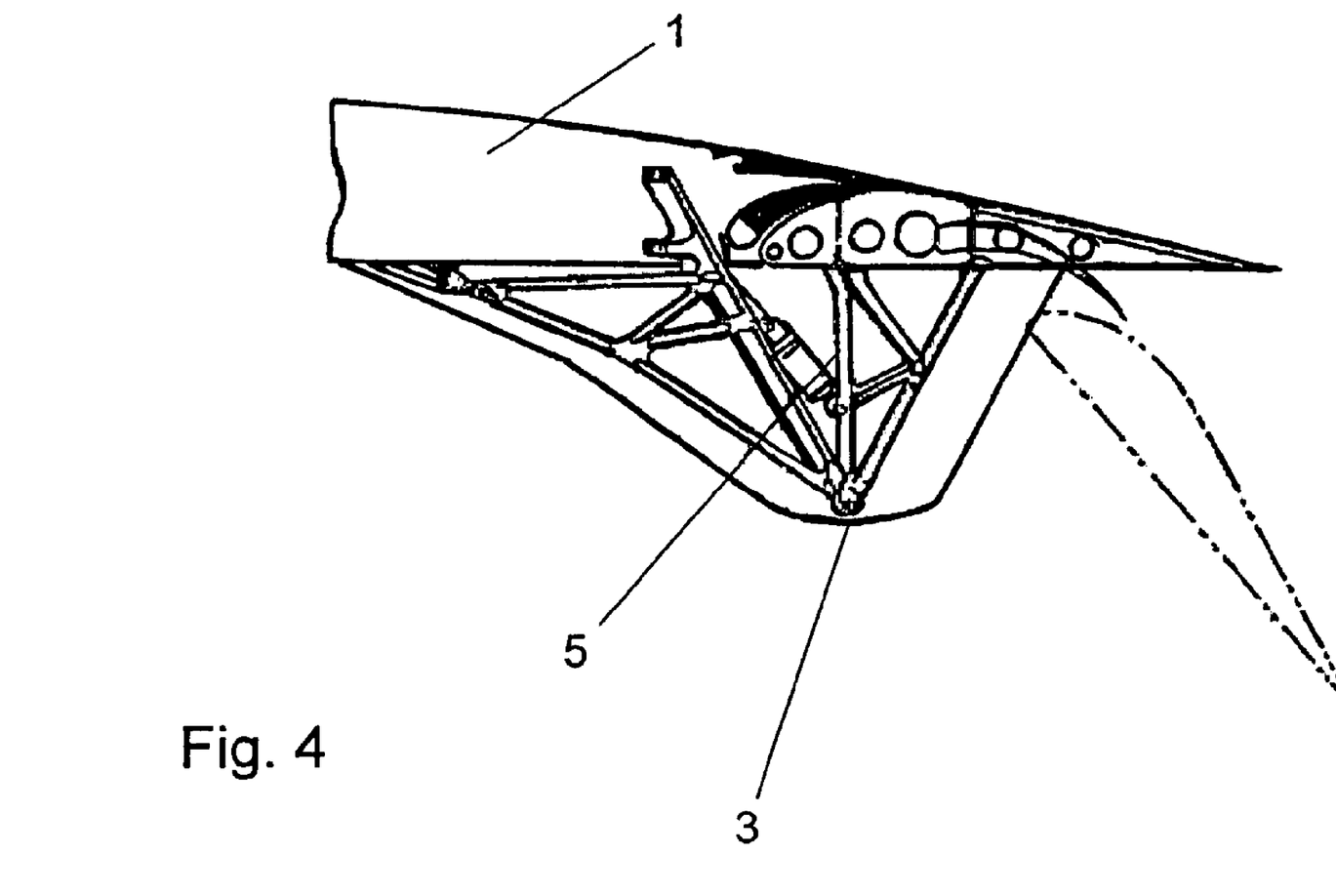
FIG. 4 shows a schematic side cross-sectional illustration of a high-lift system for an aircraft according to one exemplary embodiment of the invention.

FIGS. 1 and 4 show dropped hinge flap kinematics, in which the high-lift flap 2 which is arranged on the mainplane 1 of the aircraft is mounted on a rotating arm or flap lever 5 such that it can pivot about a rotation point 3 which is provided under the wing 1. FIG. 4 shows the flap 2 in the retracted position, in which it continues the wing profile continuously essentially without any gap, and in a completely extended position, corresponding to a landing position, with the flap lever 5 not being illustrated in the latter case, in order to improve the clarity. A hydraulic actuator can be provided as the actuating drive, and is coupled between the flap lever 5 and a point arranged in a fixed position with respect to the mainplane 1. As shown in FIG. 2b, in the case of dropped hinge flap kinematics, the slot 4 between the wing 1 and the flap 2 opens only slowly at the start of the extension movement, because the flap 12 is moving on the circular arc.

In FIG. 1, the rotating arm or flap lever 5 on which the high-lift flap 2 is arranged and is mounted such that it can pivot about a rotation point 3 which is provided under the wing 1 (dropped hinge), is indicated only by way of a simple line.

In the exemplary embodiment shown in FIG. 1, the high-lift flap 2 is illustrated in three different positions I, II, III. In the retracted position I, a cruise flight position, the flap 2 continues the profile of the mainplane 1 continuously, essentially without any gap. In a first extended position II, and in a second extended position III, which respectively form a take-off position and a landing position, the flap 2 is positioned at a predetermined angle with respect to the wing 1, forming a slot 4 of predetermined width between the wing 1 and the flap 2. As shown in FIG. 1, the flap 1 normally has a much greater incidence in the landing position III than in the take-off position II. In the exemplary embodiment shown in FIG. 1, the flap 2 is arranged in a fixed position on the flap lever 5, that is to say it is essentially rigidly connected to it and therefore pivots during extension on a circular path about the rotation point 3, the radius of which circular path is governed by the length of the flap lever 5. These positions should be regarded as being only examples, and the kinematics may, of course, also be formed differently.

The rotation point 3 about which the flap 2 can be pivoted is arranged in a variable position with respect to the wing 1, in a predetermined manner, specifically essentially on the same plane as the pivoting movement of the flap 2, that is to say on the plane at right angles to the rotation axis which runs through the rotation point, about which the flap 2 can be pivoted by way of the flap lever 5, and may, for example, be provided on a kinematic element 6 which is arranged such that it can move with respect to the wing 1 and whose position can be varied by way of a drive device, which is not illustrated in its own right in FIG. 1. In the illustrated exemplary embodiment, the kinematic element 6 is formed by a lever or an eccentric, which is mounted such that it can rotate about a second rotation point 7, which is arranged in a fixed position with respect to the wing 1. The first rotation point 3 about which the rotating arm or flap lever 5 rotates or pivots, is separated by a predetermined distance from the second rotation point 7. The lever or eccentric 6 can be moved about the second rotation point 7 by way of the drive device, with the first rotation point 3 describing the circular path about the second rotation point 7, as shown in FIG. 1.

The drive device by way of which the position of the kinematic element 6 can be varied can be operated independently of the actuating drive for the high lift flap 2, or can be operated by being positively coupled to the actuating drive for the flap 2, or to an element which is driven by it.

The rotation point 3 about which the flap lever 2 is mounted such that it can pivot can be moved by the drive device such that it assumes a first position with respect to the aircraft longitudinal direction "x" and the aircraft vertical direction "z" when the flap 2 is in the retracted position I, which corresponds to the cruise flight position, in which first position the flap 2 continues the profile of the wing 1 essentially without any gap and continuously, as is shown in FIG. 1.

In the first, extended position II, as shown in FIG. 1, which corresponds to the take-off position, the rotation point 3 assumes a second position which is located forward of the first position with respect to the aircraft longitudinal direction "x" in the illustrated exemplary embodiment, with the first position being that which the rotation point 3 assumes in the cruise flight position I. In other words, for the take-off position, the rotation point 3 is moved forwards and downwards with respect to the wing 1, which leads to the slot 4 between the wing 1 and the flap 2 being created and enlarged, and to an increase in the flow from the lower face of the mainplane 1 to the upper face of the flap, and thus to an increase in the lift.

In the third position III of the flap 2, which is shown in FIG. 1 and corresponds to the landing position, the kinematic element 6 is rotated such that the rotation point 3 about which the rotating arm or flap lever 5 pivots assumes a third position which, in the illustrated exemplary embodiment, is located to the rear with respect to the aircraft longitudinal direction "x" and above, with respect to the aircraft vertical direction "z", that of the second position of the rotation point 3 for the take-off position II.

In the landing position III, the incidence angle of the flap 2 with respect to the wing 1 is greater, that is to say the flap lever 5 has been rotated through a larger angle from the cruise flight position I than in the case of the take-off position II. In the position III, the flap 2 has been moved further aft and upwards with respect to the wing 1 than would be the case if the flap 2 were rotated further from the take-off position to the landing position with the position of the rotation point 3 remaining unchanged. This results in the wing profile being effectively lengthened, with the upper face of the flap 2 being offset less downwards and forwards with respect to the upper face of the wing 1.

The kinematic element 6 in the form of the lever or eccentric can be operated by an electrical or hydraulic drive device, or in some other suitable manner.

The positions of the rotation point 3 which correspond to the various positions I, II, III of the flap 2 and about which the flap 2 can be pivoted on the flap lever 5 lie on a circular path when the kinematic element 6 is embodied in the form of a lever or eccentric, with the center point of this circular path being formed by the second rotation point 7 of the kinematic element 6. It is possible to move continuously between each of the positions of the rotation point 3 which correspond to the various positions I, II, III of the flap 2, so that the rotation point 3 can be moved from the position which corresponds to the cruise flight position I (retracted flap) via the position which corresponds to the take-off position II (partially extended flap) to the position which corresponds to the landing position III (completely extended flap), and in the opposite direction. The method of operation is therefore the same as that for the known flap kinematics.

Figure 3:
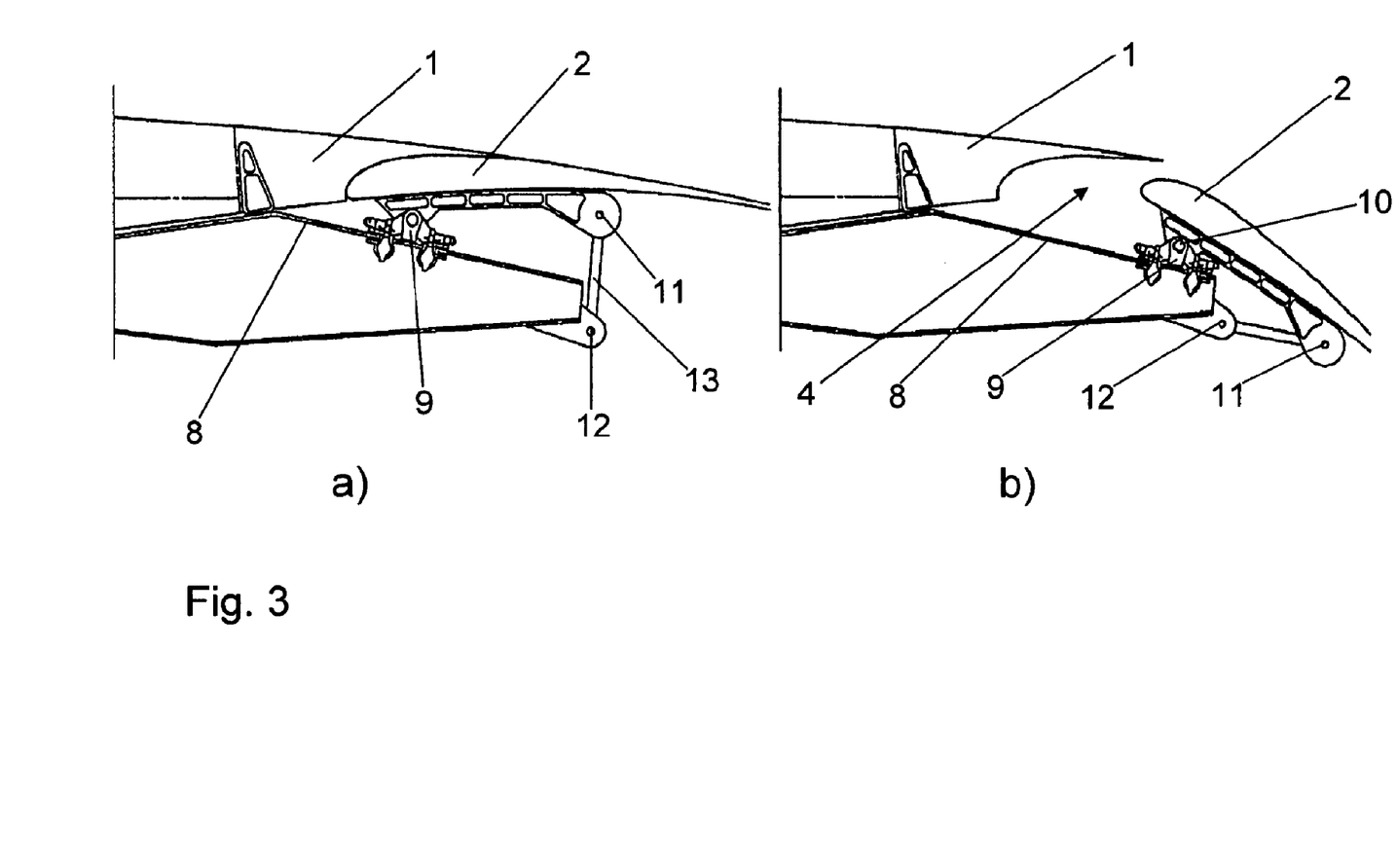
FIGS. 3a and 3b show a side view of a high-lift system for an aircraft according to a further exemplary embodiment of the invention, with FIG. 3a showing the exemplary embodiment in the retracted state, and FIG. 3b showing the exemplary embodiment in the extended state.

A mechanism for operating a Fowler flap in the form of so-called track rear link kinematics according to a further exemplary embodiment of the invention is illustrated in FIGS. 3a and 3b. A track 8 which extends obliquely downwards to the rear from the wing 1 is provided on the lower face of the wing and a carriage 9 is mounted such that it can move on this track, with the carriage 9 being coupled to a rotation point in the front area of the flap 2 via a first joint 10. A lever 13 (rear link) is arranged between a second joint 11, which is located further to the rear on the flap 2, and a third joint 12, which is arranged at the rear end of the track 8, by way of which lever the rear part of the flap is drawn downward in the sense of increasing the incidence angle as the extension movement increases. FIG. 3a shows the retracted state, corresponding to a cruise flight position, of the flap 2, FIG. 3b shows the completely extended state of the flap 2 corresponding to a landing position. In the case of a Fowler flap such as this, this results in relatively quick opening of the slot 4 that is located between the wing 1 and the landing flap 2, by virtue of the inclined position of the track 8 with respect to the aircraft longitudinal direction x, as can be seen from FIG. 2a.

One or more of the joints or rotation points 10, 11 and 12 about which the flap 2 can be pivoted is or are in turn arranged in a variable position, specifically in the case of the rotation point 10 in the sense of an additional relative movement with respect to the track 8 or the wing 1, and in the case of the rotation point 11 in the sense of an additional relative movement between the flap 2 and the lever 13. This additional relative movement is once again carried out essentially on the same plane as the pivoting movement of the flap 2.

The joint or the rotation point 10, 11, 12 or at least one of the joints or one of the rotation points 10, 11, 12 is or are provided on a corresponding kinematic element which is arranged such that it can move and whose position can be varied by a drive device. In a similar manner to that in the case of the first exemplary embodiment shown in FIG. 1, the kinematic element can, for example, be formed by a lever or an eccentric which—depending on the joint or rotation point 10, 11, 12 at which it is provided—is mounted such that it can rotate about point 12 and lever 13 on the carriage 9, on the track 8 or between them. When the lever or eccentric rotates, the rotation points 10, 11, 12 follows a corresponding circular path.

The drive device, by way of which the position of the kinematic element can be varied, can in turn be operated independently of the actuating drive of the high lift flap 2, or can be operated positively coupled to the actuating drive of the flap 2, or to an element which is driven by it.

The variability in the position of one or more of the joints or rotation points 10, 11, 12 can therefore in each case be achieved by an additional joint which is coupled via a lever or a crank to the respective variable-position joints or the rotation points 10, 11, 12, in which case the lever or the crank can be moved or pivoted by way of a drive apparatus. This implementation can also be provided for the embodiments shown in FIGS. 1 and 4.

In addition, if an appropriate first joint whose position can be varied is provided in the respective embodiment, a guide apparatus can be provided at the respective first variable-position joint, instead of a second joint, by way of which the respective first joint can be positioned, guided by this apparatus. In this case, the first joint is moved by way of an actuating apparatus to a predetermined position by way of the drive device, which is coupled to the respective variable-position or first joint, so that it is possible to set a predetermined position for the variable-position joint as a function of the set movement position of the flap 2. The guide apparatus may have a guide path with which or by way of which the respective variable-position or first joint is guided by way of a drive device in order to vary or move the position of the joint. The guide path may be linear or curved, or may be linear and curved in different places. The guide path may, in particular, have a circular path at least in places. However, the guide apparatus may also have a coupling device by way of which the respective variable-position joint is mechanically coupled to an associated second joint, which is guided in the movement path, so that the positions of the first joint and of the second joint are positively coupled. This coupling device may be a lever, a lever linkage or a transmission which is mounted, or whose position is guided, in an articulated form in the guide path.

In particular, if no mechanical coupling is provided between the drive apparatus and a second joint of the guide apparatus in these embodiments, the position of the respective variable-position joint can be varied via a control device with an operating apparatus, with the control device receiving information about the respective position of the flap 2 as an input variable and using this to determine set positions for the respective first joint and, from this, sending an appropriate command to the drive device. This command is used to operate the drive device and moves the first joint to an appropriate position by way of the guide apparatus. Furthermore, a sensor can be provided in this case, which detects the position of the respective first joint and transmits a value corresponding to this position to the control device, which compares the actual position of the respective first joint with the set position by way of a control function that is implemented in it, and, in the event of any discrepancies between these positions, produced commands to position the respective first joint at its set position.

These embodiments with the guide apparatus with/without a control device can be provided at one or more of the joints in the high-lift system.

LIST OF REFERENCE SYMBOLS

1 Mainplane
2 High-lift flap
3 (first) Rotation point
14 Slot

5 Flap lever
6 Kinematic element
7 Second rotation point
8 Track
9 Carriage
10 Joint
11 Joint
12 Joint
13 Lever

The invention claimed is:

1. A high-lift system for an aircraft, comprising:
   a wing;
   a high-lift flap coupled to the wing;
   a kinematic element which is driven by a drive device;
   a flap lever structured and arranged to rotate via an actuating drive between a retracted position, in which the high-lift flap complements a wing profile, and a plurality of extended positions, in which a slot of a given width is formed between the wing and the high-lift flap;
   a first end of the flap lever being coupled to the high-lift flap;
   a second end of the flap lever being coupled to the kinematic element and being capable of rotating relative thereto via a first rotation point;
   the kinematic element being structured and arranged to rotate relative to a second rotation point that is fixed in position relative to the wing,
   wherein the first rotation point is separated by a predetermined distance from the second rotation point;
   wherein the high-lift flap is structured and arranged to assume the following positions upon rotation of the kinematic element:
   a retracted or cruise flight position, whereby the high-lift flap continuously complements the wing profile and the first rotation point assumes a first position with respect to an aircraft longitudinal direction and an aircraft vertical direction;
   a first extended or take-off position, whereby the first rotation point assumes a second position located under the first position with respect to the aircraft vertical direction and forward of the first position with respect to the aircraft longitudinal direction; and
   a second extended or landing position, whereby the first rotation point assumes a third position which is located aft of the second position with respect to the aircraft longitudinal direction and above the second position with respect to the aircraft vertical direction.

2. The system of claim 1, wherein the high-lift flap is coupled to the wing via a dropped hinge mechanism.

3. The system of claim 1, wherein the kinematic element comprises a lever.

4. The system of claim 1, wherein the kinematic element comprises an eccentric.

5. The system of claim 1, wherein the kinematic element comprises one of:
   a lever; and
   an eccentric.

6. The system of claim 1, wherein the drive device and the actuating drive are capable of being operated one of:
   in a coupled manner; and
   independently.

7. The system of claim 1, wherein the first rotation point changes rotationally when the kinematic element is rotated about the second rotation point.

8. A method of using the system of claim 1, the method comprising:
   rotating the kinematic element in order to move the high-lift flap between the following positions:
   a retracted or cruise flight position, whereby the high-lift flap continuously complements the wing profile and the first rotation point assumes a first position with respect to an aircraft longitudinal direction and an aircraft vertical direction;
   a first extended or take-off position, whereby the first rotation point assumes a second position located under the first position with respect to the aircraft vertical direction and forward of the first position with respect to the aircraft longitudinal direction; and
   a second extended or landing position, whereby the first rotation point assumes a third position which is located aft of the second position with respect to the aircraft longitudinal direction and above the second position with respect to the aircraft vertical direction.

9. A high-lift system for an aircraft, comprising:
   a wing;
   a high-lift flap movably coupled to the wing via a dropped hinge mechanism; and
   a kinematic device which is driven by a drive, is capable of rotating about a rotation point between first, second and third rotation positions, and, when rotated, changes a position of the high-lift flap relative to the wing,
   wherein the high-lift flap is structured and arranged to assume the following positions upon rotation of the kinematic device about the rotation point:
   a retracted or cruise flight position, whereby the high-lift flap continuously complements the wing profile based on the first rotation position of the kinematic device with respect to an aircraft longitudinal direction and an aircraft vertical direction;
   a first extended or take-off position in which a slot of a given width is formed between the wing and the high-lift flap, whereby the second rotation position of the kinematic element assumes a position located under the first rotating position with respect to the aircraft vertical direction and forward of the first rotation position with respect to the aircraft longitudinal direction; and
   a second extended or landing position in which a slot of a larger given width is formed between the wing and the high-lift flap, whereby the third rotation point of the kinematic device assumes a position which is located aft of the second rotation position with respect to the aircraft longitudinal direction and above the second rotation position with respect to the aircraft vertical direction.

* * * * *